US012394262B2

(12) United States Patent
Niu et al.

(10) Patent No.: US 12,394,262 B2
(45) Date of Patent: Aug. 19, 2025

(54) SYSTEMS AND TECHNIQUES FOR PRIORITIZING COLLECTION AND OFFLOAD OF AUTONOMOUS VEHICLE DATA

(71) Applicant: GM Cruise Holdings LLC, San Francisco, CA (US)

(72) Inventors: Kangyuan Niu, Northridge, CA (US); Sudarshan Gaikaiwari, Foster City, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 143 days.

(21) Appl. No.: 18/169,419

(22) Filed: Feb. 15, 2023

(65) Prior Publication Data

US 2024/0273956 A1 Aug. 15, 2024

(51) Int. Cl.
*G07C 5/08* (2006.01)
*G07C 5/00* (2006.01)

(52) U.S. Cl.
CPC ........... *G07C 5/0841* (2013.01); *G07C 5/008* (2013.01)

(58) Field of Classification Search
CPC .............................. G07C 5/0841; G07C 5/008
See application file for complete search history.

(56) References Cited

U.S. PATENT DOCUMENTS

| | | | | |
|---|---|---|---|---|
| 2018/0261020 | A1* | 9/2018 | Petousis | G07C 5/0841 |
| 2020/0193736 | A1* | 6/2020 | Lawrence | G07C 5/085 |
| 2020/0364953 | A1* | 11/2020 | Simoudis | G06N 20/00 |
| 2020/0412811 | A1* | 12/2020 | Campbell | H04L 65/752 |
| 2021/0011908 | A1* | 1/2021 | Hayes | G06N 20/00 |
| 2021/0097784 | A1* | 4/2021 | Castano | G07C 5/008 |
| 2022/0319252 | A1* | 10/2022 | Oitate | G07C 5/008 |
| 2023/0282036 | A1* | 9/2023 | Simoudis | G06N 3/08 |

* cited by examiner

*Primary Examiner* — Michael J Zanelli

(74) *Attorney, Agent, or Firm* — Honigman LLP; Matthew H. Szalach; Jonathan P. O'Brien

(57) ABSTRACT

The present disclosure generally relates to identification and prioritization of autonomous vehicle (AV) data collection and data offload. In some aspects, the present disclosure provides a process for receiving one or more data collection triggers from an AV fleet management system, wherein the one or more triggers identify at least one condition that triggers collection of AV data by an AV; compiling the AV data in response to detecting the at least one condition identified by the one or more data collection triggers; determining a set of priorities that are associated with the one or more data collection triggers, wherein the set of priorities includes at least one instruction for prioritizing transmission of the AV data to the AV fleet management system; and transmitting, based on the set of priorities, the AV data to the AV fleet management system.

20 Claims, 7 Drawing Sheets

SYSTEMS AND TECHNIQUES FOR PRIORITIZING COLLECTION AND OFFLOAD OF AUTONOMOUS VEHICLE DATA

BACKGROUND

1. Technical Field

The present disclosure generally relates to autonomous vehicles and, more specifically, to systems and techniques for configuring collection and offload of autonomous vehicle data.

2. Introduction

An autonomous vehicle is a motorized vehicle that can navigate without a human driver. An exemplary autonomous vehicle can include various sensors, such as a camera sensor, a light detection and ranging (LiDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at fixed locations on the autonomous vehicles.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
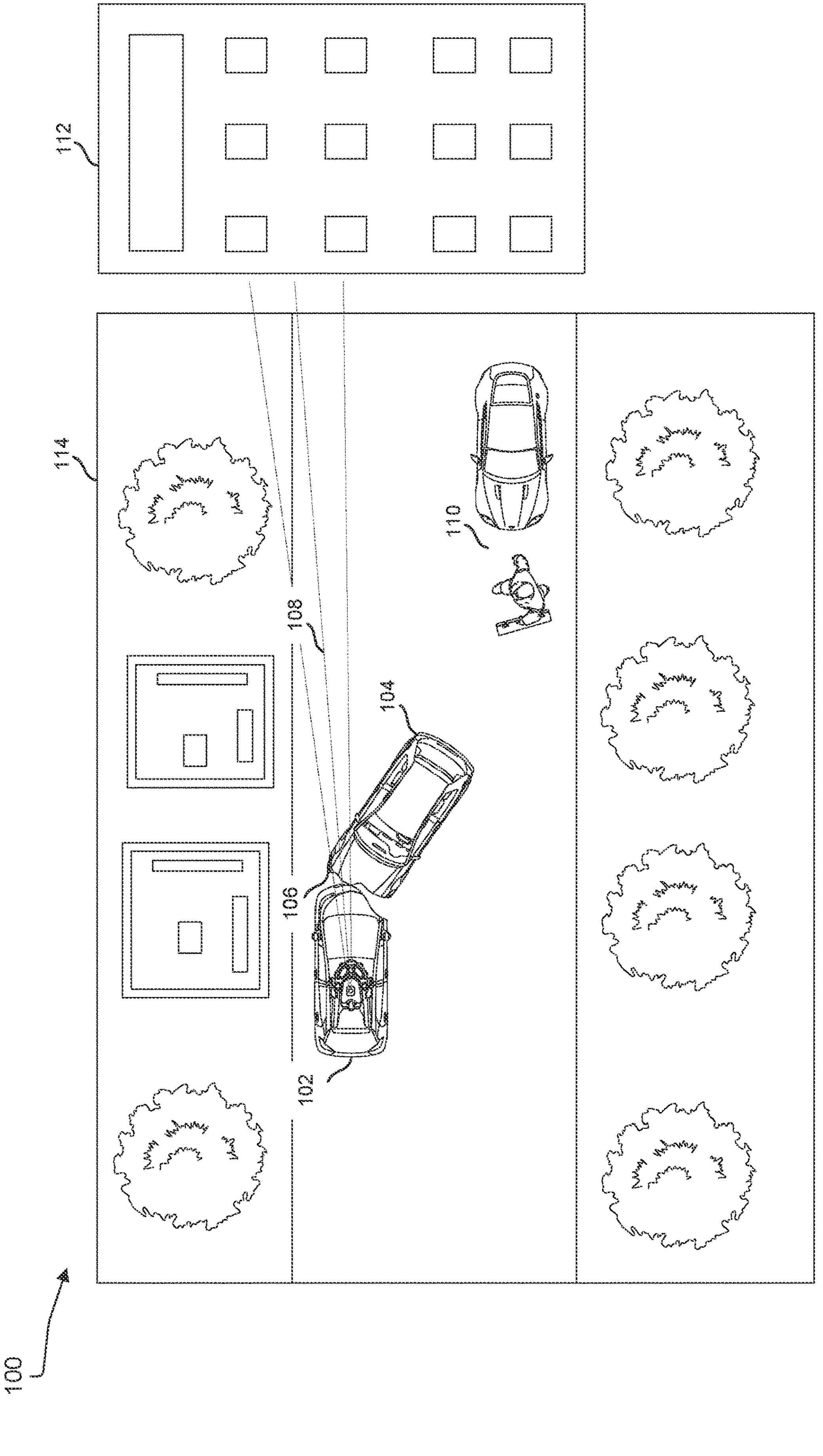
FIG. 1 illustrates an example system for implementing AV data collection and data offload, according to some examples of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

One aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Autonomous vehicles (AVs), also known as self-driving cars, driverless vehicles, and robotic vehicles, are vehicles that use sensors to sense the environment and move without human input. Automation technology enables the AVs to drive on roadways and to perceive the surrounding environment accurately and quickly, including but not limited to pedestrians, obstacles, signs, and traffic lights. In some cases, AVs can be used to pick up passengers and drive the passengers to selected destinations.

As discussed above, AVs are designed to navigate autonomously in an environment without human input or intervention. In order to navigate autonomously, AVs can include sensor systems (e.g., LiDAR, RADAR, ultrasonic, IMU, GNSS as illustrated by sensor systems 504, 506 and 508 in FIG. 5) that enable the AV to "see" the surrounding environment.

In some aspects, an AV may collect and store a large amount of data while the AV is in operation (e.g., navigating in the environment). For example, an AV may store data collected from one or more AV sensors (e.g., raw sensor data, processed sensor data, filtered sensor data, etc.), object classification data (e.g., type of object, bounding box, etc.), prediction data (e.g., predicted object trajectory), AV planning data (e.g., planned route, diversions, etc.), AV performance/diagnostic data (e.g., battery charge level, battery temperature, power, efficiency, etc.), AV event data (e.g., collision event, intrusion event, safety event, passenger comfort event, etc.), and/or any other type of data. In one illustrative example related to a LiDAR system, the AV may store data corresponding to a three-dimensional (3D) representation of the surrounding environment.

In some cases, storing AV data may require significant computing resources (e.g., memory and processing). In addition, transmitting or offloading large amounts of AV data may not be feasible due to compute and/or network limitations (e.g., network speed and/or network bandwidth limitations). Consequently, there may be a delay in accessing data that is collected by the AV because the AV may need to return to an AV fleet management center or service depot where a technician can retrieve the data from the AV's data storage device (e.g., hard disk drive or flash drive system). As a result, the AV may be out of service for additional time and there may be an undesirable delay in accessing critical AV data.

Systems, apparatuses, and processes (also referred to as methods), and computer-readable media (collectively referred to as "systems and techniques) are described herein for configuring an AV to collect AV data based on one or more data collection triggers (e.g., received from an AV fleet management center or determined by a machine learning model). In some aspects, the data collection triggers may be associated with one or more priority metrics. For example, the priority metrics can include instructions for prioritizing collection of AV data, assembly of AV data, offload (e.g., transmission) of AV data, and/or any other type of prioritization metric.

In some aspects, the AV fleet management system (e.g., a system located at an AV fleet management center) can transmit one or more data collection triggers to the AV that specify one or more events or conditions that can cause the AV to collect and/or offload AV data (e.g., sensor data or other data stored on a local computing device of the AV) to the AV fleet management system. In some instances, the data collection triggers may be identified or determined using machine learning algorithms (e.g., neural networks) that are located on the local computing device of the AV or at the AV fleet management system. In some cases, the data collection triggers may be configured by an operator of the AV fleet management system (e.g., using a graphical user interface (GUI) for configuring data collection triggers).

In some examples, the AV data that is offloaded from the AV to the AV fleet management system may be smaller in file or memory size (e.g., less bytes of data) compared to the data set collected by (e.g., AV sensor data) or stored on the AV. In some cases, the AV may transmit AV data while autonomously navigating in the environment or after returning back to an AV fleet management center or depot (e.g., a physical location where a fleet of AVs are stored). In some instances, the AV may use a wireless network connection (e.g., cellular, Wi-Fi, Bluetooth®, NFC, etc.) while navigating or at the AV fleet management center to transmit AV data.

Examples of conditions identified by the data collection triggers sent by the AV fleet management system to the AV may include, but are not limited to, timeframe, location, fleet type (e.g., commercial, research and development, etc.), collision (e.g., a collision between the AV and another vehicle), intrusion (e.g., a safety intrusion to the AV such as an attempted break-in), map change detection (e.g., offloading map changes), safety metric detection (e.g., distance to another vehicle, braking distance, acceleration, pedestrian near the AV, etc.), external event (e.g., a detected event external to the AV such as an incident with a pedestrian or other vehicle), and traffic condition (e.g., detecting/navigating construction zones, a specified traffic situation such as an unprotected left turn, etc.). Those skilled in the art will appreciate additional examples of events identified by the data collection triggers that may be sent to the AV.

In some cases, a set of priorities that are associated with the data collection triggers may also be transmitted by the AV fleet management system to the AV. For example, the AV fleet management system may specify a prioritization for the collection (e.g., collecting AV data for a future event such as a collision or external event), assembly (e.g., assembling AV data from stored sensor data such that the assembled AV data is a smaller file size than the stored sensor data) and transmission (e.g., prioritizing portions or subsets of the AV data for transmission while the AV is autonomously navigating or after returning to the AV fleet management center) of the AV data. In some aspects, the set of priorities may be pre-configured on the AV and/or may be determined using machine learning algorithms (e.g., a neural network) located on the local computing device of the AV.

Figure 2:
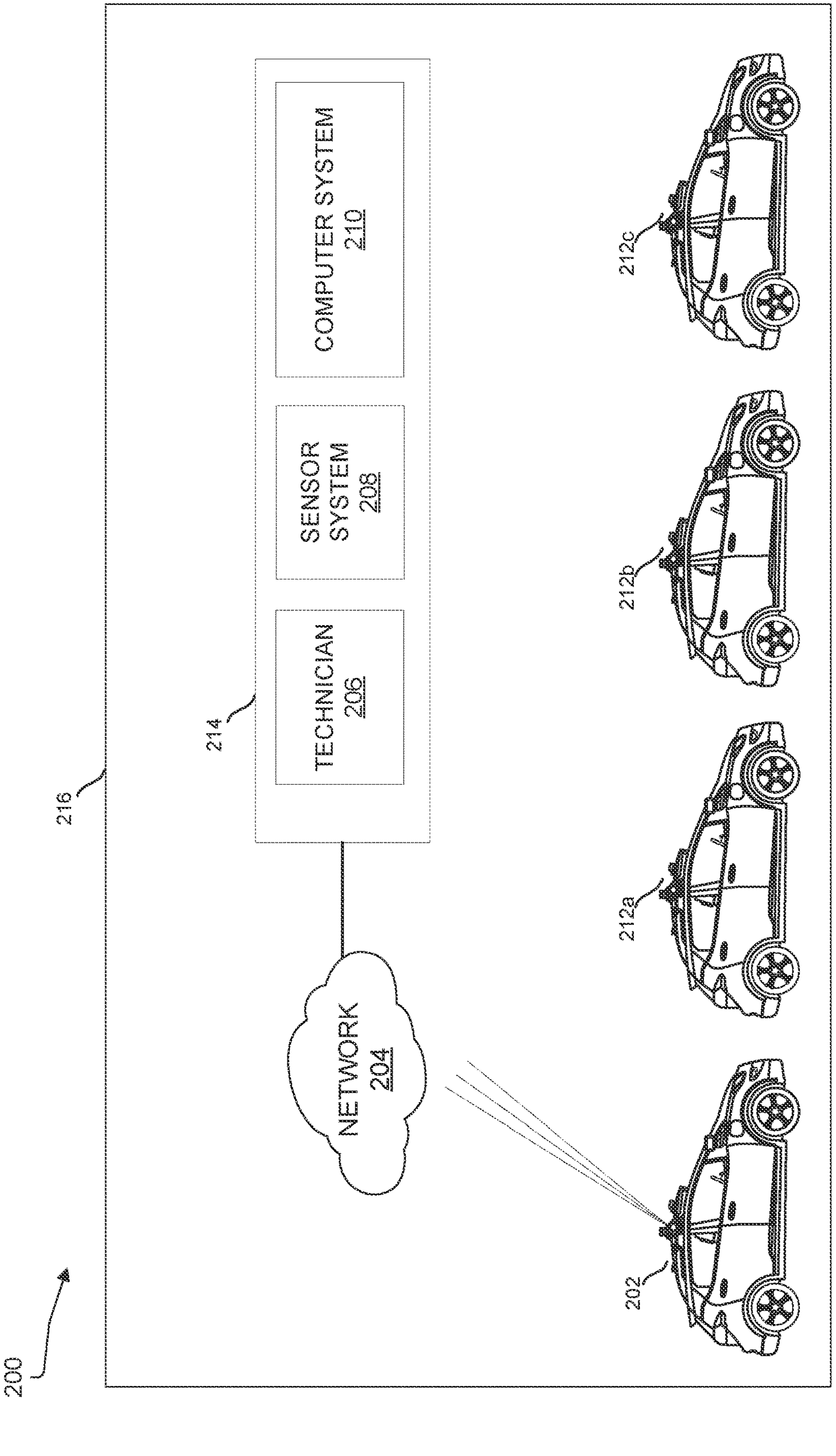
FIG. 2 illustrates another example system for implementing AV data collection and data offload, according to some examples of the present disclosure.

FIG. 1 illustrates an example of a system 100 in which an AV may be configured to implement data collection and/or data offload. In some cases, system 100 can include AV 102, second vehicle 104, collision event 106, RF signal 108, external event 110, AV fleet management center 112, and environment 114. In some aspects, AV fleet management center 112 may communicate with AV 102 via RF signal 108 (e.g., over a wireless network (not illustrated)). For example, AV fleet management center 112 may include an AV fleet management system (e.g., AV fleet management system 214 as illustrated in FIG. 2) capable of exchanging data (e.g., transmitting and receiving data) with AV 102. Examples of RF signal 108 types may include, but are not limited to, Ultra-Wideband (UWB), Li-Fi, cellular, Wi-Fi, Wireless Local Area Network (WLAN), Low Power Wide Area Network (LPWAN), Bluetooth®, satellite-based (e.g., SpaceX Starlink, Amazon Kuiper), and infrared. Those skilled in the art will appreciate additional examples of RF signal 108 types for communications.

Figure 5:
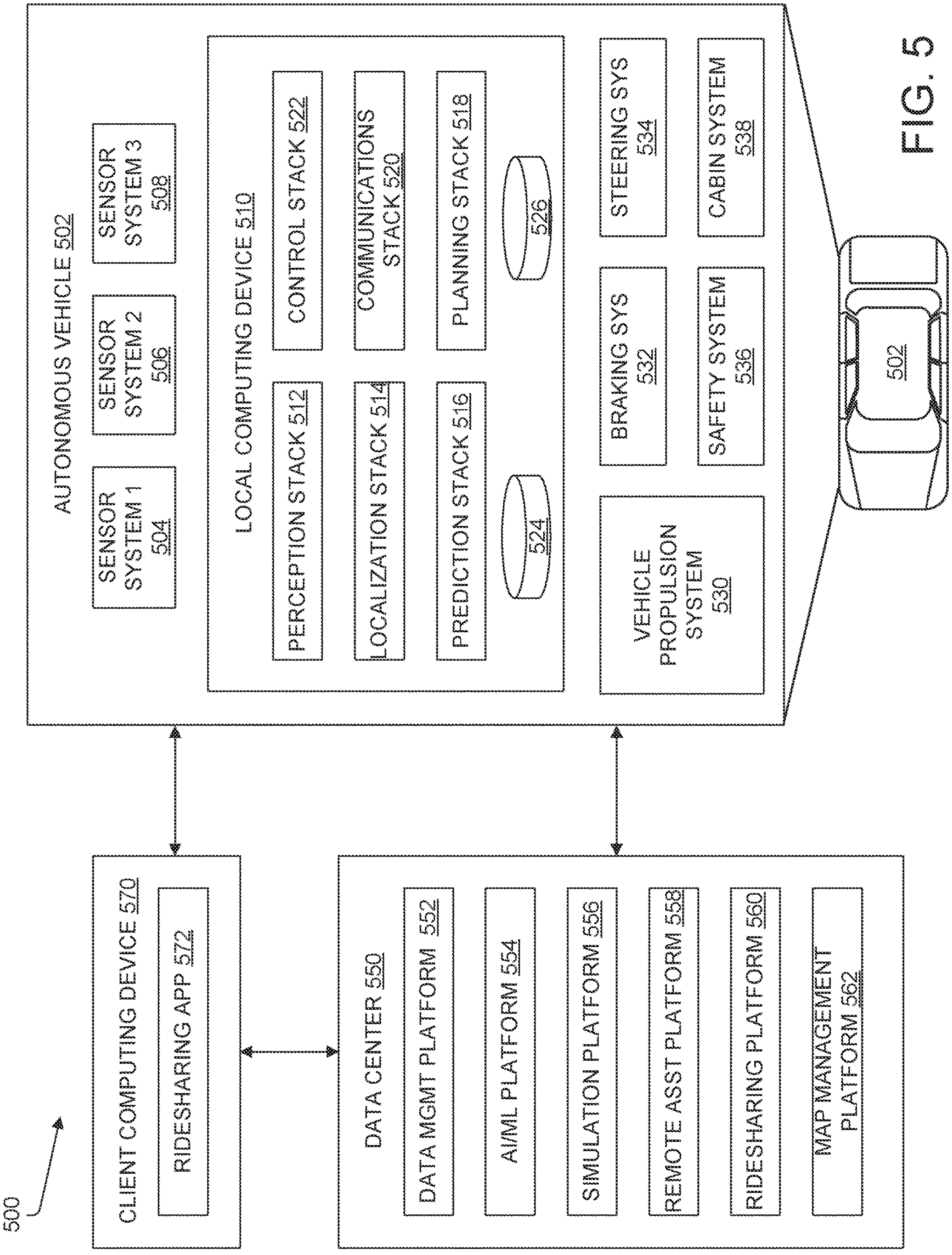
FIG. 5 illustrates an example system environment that can be used to facilitate autonomous vehicle (AV) dispatch and operations, according to some examples of the present disclosure.

In some examples, AV 102 may include sensor systems such as LiDAR, RADAR, and cameras (e.g., sensor systems 504, 506, and 508 as illustrated in FIG. 5) capable of collecting sensor data from the environment 114 where AV 102 is autonomously navigating. In some aspects, AV fleet management center 112 may transmit (e.g., via RF signal 108) one or more data collection triggers (e.g., data collection triggers as software) that may be received by a local computing device (e.g., local computing device 510 as illustrated in FIG. 5) on AV 102. For example, AV fleet management center 112 may use a Graphical User Interface (GUI) type of software interface with data fields that can specify one or more data collection triggers.

In some aspects, the data collection triggers may identify one or more events that cause AV 102 to assemble or collect data. In other words, the data collection triggers may instruct software stored on the local computing device of AV 102 to collect AV data (e.g., collect data via sensor systems for an event identified by the data collection triggers) or assemble AV data (e.g., assemble data from stored data on the local computing device) based on one or more events or conditions identified by the data collection triggers. For example, the data collection triggers may identify a collision event 106 as an event for which AV 102 collect and stores data (e.g., sensor system data). In another example, the data collection triggers may identify a previous time window (e.g., a time period that has already transpired) as an event for which AV 102 starts assembling data (e.g., assembling a subset of data from data stored on AV 102). As used herein, compiling AV data can include collecting data (e.g., collecting data via sensor systems on AV 102) or assembling data (e.g., assembling data from stored data on AV 102).

Figure 6:
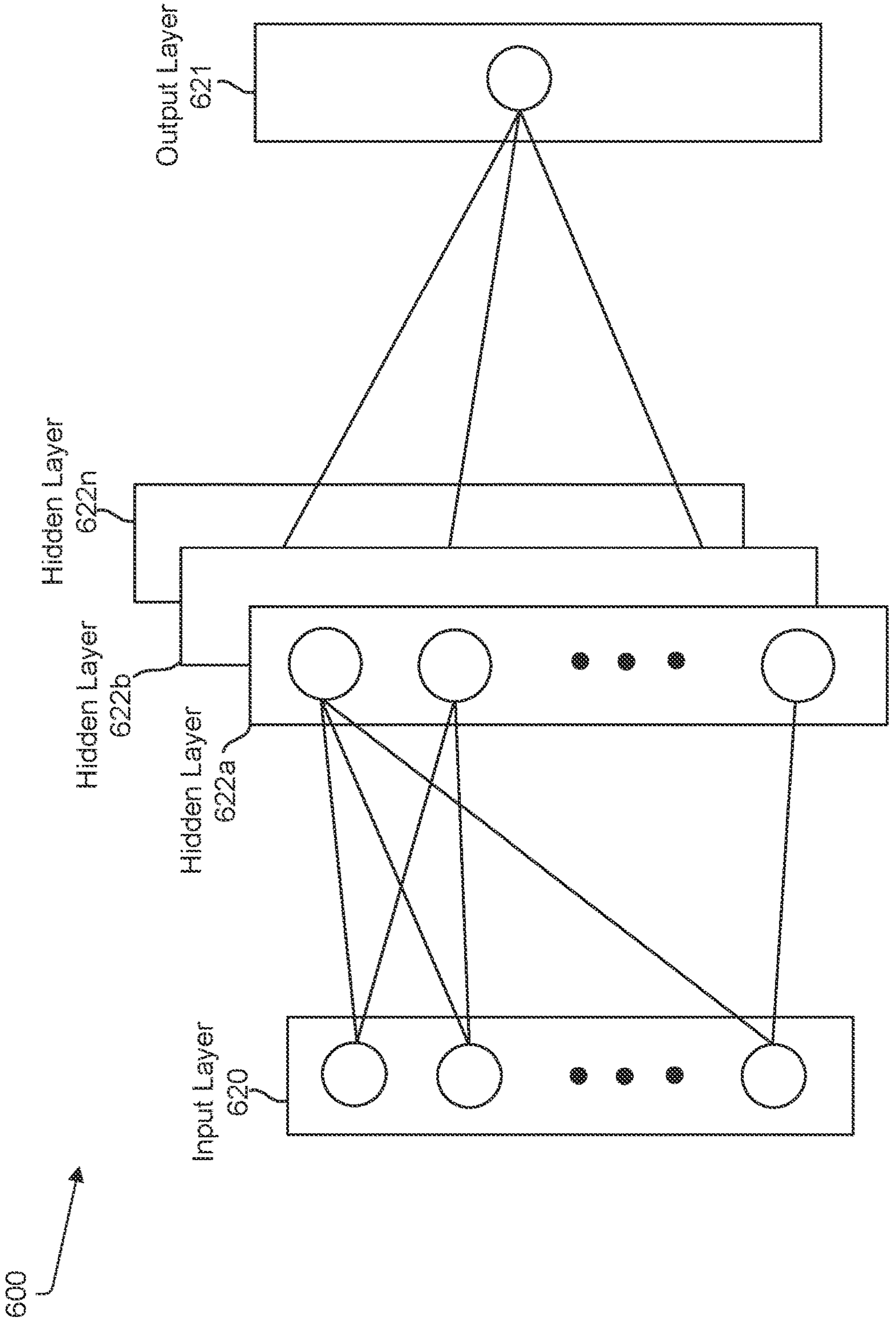
FIG. 6 illustrates an example of a deep learning neural network that can be configured to generate data collection triggers and/or priority metrics for data collection and data offload, according to some examples of the present disclosure.

In some examples, AV 102 may transmit or offload (e.g., via communications stack 520 as illustrated in FIG. 5) the collected or assembled AV data to AV fleet management center 112 while autonomously navigating (e.g., transmit via a cellular connection) or after returning to AV fleet management center 112 (e.g., transmit via a Wi-Fi connection). In some examples, AV fleet management center 112 can be a location where one or more autonomous vehicles (e.g., AV 102) are stored or located while not autonomously navigating in environment 114. In some aspects, a machine learning model (e.g., deep learning neural network 600 as illustrated in FIG. 6) located on AV 102 may use machine learning algorithms to determine the one or more data collection triggers to instruct AV 102 to collect or assemble AV data. In some instances, AV 102 may transmit (e.g., transmit to AV fleet management center 112) the AV's 102 internal machine learning system state (e.g., AV 102 state, inputs, and outputs of a machine learning model such as deep learning neural network 600) that drive AV 102.

As described above, there may be one or more conditions or events identified by the data collection triggers that can trigger AV 102 to collect or assemble AV data for transmission to AV fleet management center 112. In some examples, the condition specified by the data collection triggers can be for AV 102 to collect AV data within a specified time frame (e.g., collect and store LiDAR data for next 24 hours while AV 102 is navigating in environment 114) or assemble AV data from previously stored data on AV 102 (e.g., retrieve LiDAR data from the last 2 hours). In another example, a condition specified by the data collection triggers (e.g., received from AV fleet management center 112) may instruct AV 102 to collect AV data (e.g., sensor data) based on the detection of a collision event (e.g., a collision event 106 between AV 102 and second vehicle 104). In some aspects, the AV data used to detect the collision event can be transmitted to AV fleet management center 112 for further analysis (e.g., to confirm whether a collision event occurred and/or to further train or refine one or more machine learning models on the AV).

In another example, conditions specified by the data collection triggers may instruct AV 102 to collect AV data based on a location (e.g., location of AV 102 such as a geographic location). For example, AV 102 may be configured to collect AV data when traversing a high-traffic intersection that is known to have a high rate of traffic collisions. In another example, conditions specified by the data collection triggers may instruct AV 102 to collect AV data based on a fleet type of AV 102. In some cases, the fleet type may correspond to an AV used as commercial vehicle (e.g., delivery), a ride-haling vehicle servicing passengers, a research and development vehicle, and/or any other type of operation.

In another example, a condition specified by the data collection triggers may instruct AV 102 to collect AV data based on detection of an intrusion event (e.g., attempted break-in to AV 102 or other intrusion to AV 102) or a tampering event (e.g., attempted tampering with one or more components of AV 102). In another example, a condition specified by the data collection triggers may instruct AV 102 to collect AV data based on a map change detection (e.g., AV 102 sensor systems detect a map change of environment 114). In another example, a condition specified by the data collection triggers may instruct AV 102 to collect AV data based on a safety metric detection (e.g., AV 102 detects a safety issue including, but not limited to, distance to another vehicle, braking distance, pedestrian distance to AV 102, acceleration, potential collision risk with another object or vehicle in environment 114).

In another example, a condition specified by the data collection triggers may instruct AV 102 to collect AV data based on an external event (e.g., AV 102 detects an external event 110 including, but not limited to, a pedestrian colliding with another vehicle, collision with other vehicles in environment 114, a building fire, etc.). In another example, a condition specified by the data collection triggers may instruct AV 102 to collect AV data based on a traffic condition (e.g., AV 102 detects a traffic condition including, but not limited to, construction zones, stop signs, broken traffic lights, unprotected left turns, etc.). Those skilled in the art will appreciate additional examples of events and/or conditions specified by data collection triggers that AV fleet management center 112 can transmit (e.g., via AV fleet management system 214) to AV 102.

In some aspects, the data collection triggers received by AV 102 may specify the assembly of AV data from stored data (e.g., sensor data or other data stored on the local computing device of AV 102). In some cases, the assembled AV data may result in a smaller file size (e.g., number of bytes of data) compared to the stored data on AV 102. As a result, the assembled AV data may require less network bandwidth and network speed and less computer processing resources (e.g., from local computing device 510) for transmission to AV fleet management center 112 (e.g., compared to the stored data on AV 102). In some aspects, AV 102 may transmit AV data to AV fleet management center 112 while it is autonomously navigating in environment 114. In some instances, AV 102 may transmit AV data to AV fleet management center 112 after returning to AV fleet management center 112. The AV fleet management center 112 will be discussed in further detail with respect to FIG. 2 below.

In some examples, AV fleet management center 112 may transmit prioritization data or metrics to AV 102. In other words, AV fleet management center 112 may instruct AV 102 on prioritizing at least one of collecting AV data, assembling AV data, transmitting AV data, or any combination thereof. In some aspects, the prioritization data can include a processing priority value that can instruct AV 102 on the timing (e.g., the order or sequence) for collecting, assembling, and/or transmitting AV data. For example, AV fleet management center 112 may prioritize collecting AV data for a collision event 106 from a first data collection trigger having a higher priority value than collecting AV data for number of pedestrians on a street from a second data collection trigger having a lower priority value.

In another example, the prioritization data may instruct AV 102 on the prioritization of transmitting the AV data. In other words, a high priority transmission may instruct AV 102 to transmit AV data to AV fleet management center 112 while autonomously navigating (e.g., using a cellular network) compared to a lower priority transmission which may instruct AV 102 to transmit AV data to AV fleet management center 112 after returning to AV fleet management center 112 (e.g., using a Wi-Fi network associated with the AV fleet management center 112). In some aspects, the prioritization data may include instructions regarding the transmission timeframe for the AV data (e.g., acceptable delay for transmission or specified times for transmission). In some cases, the prioritization data may include a transmission priority value that is associated with the event or condition. For instance, a collision event may be associated with the highest transmission priority value and a faulty cabin light may be associated with the lowest priority value. In some instances, the prioritization data may include a bandwidth metric that may specify a maximum or minimum allowable bandwidth for transmission of the AV data.

In some examples, AV 102 may also use machine learning algorithms (e.g., via deep learning neural network 600) for prioritizing at least one of collecting AV data, assembling AV data, transmitting AV data, or a combination thereof. For example, AV 102 may determine the priority of the AV data based on machine learning algorithms instead of a set of priorities received by AV fleet management center 112.

In some aspects, the AV data transmitted to AV fleet management center 112 can be used to further configure AV 102. For example, AV data can include LiDAR data that is used to calibrate LiDAR sensors on AV 102 remotely (e.g., calibration can be performed without AV 102 returning to AV fleet management center 112). In another example, AV data corresponding to detected events or conditions can be processed to determine if the accuracy of the event classification performed by AV 102. Confirmation and/or invalidation of event classification can be used to further refine and/or train machine learning models operating on AV 102 (e.g., perception stack 512, prediction stack 516, planning stack 518, etc.).

FIG. 2 illustrates an example of a system 200 in which an AV may be configured to implement data collection and/or data offload. In some cases, the system 200 can include AV fleet management center 216, AV fleet management system 214, network 204, AV 202, and one or more stored AVs such as AV 212*a*, AV 212*b*, and/or AV 212*c*. In some examples, the AV fleet management system 214 can include technician 206, sensor system 208, and/or computer system 210. The AV 202 may communicate (e.g., send and receive data) with AV fleet management system 214 via network 204. In some examples, network 204 may include, but is not limited to, a cellular connection, a Wi-Fi connection, or a Bluetooth® connection for AV 102 to exchange data with computer system 210. In some aspects, technician 206 (e.g., a person capable of servicing or working with AV 202) may receive AV data (e.g., stored data on AV 202) from AV 202 by manually accessing the data from AV 202 (e.g., accessing the memory of the local computing device of AV 202). In some cases, technician 206 may access AV data that is stored on AV 202 via computer system 210 (e.g., which can wirelessly or via a wired connection receive AV data from AV 202 via network 204).

In some instances, the AV fleet management system 214 may include a sensor system 208 which can detect when AV 202 is located at AV fleet management center 216. In some cases, sensor system 208 can detect when AV 202 returns to AV fleet management center 216 after autonomously navigating an environment. In some aspects, after detecting the arrival of AV 202, sensor system 208 can instruct computer system 210 to instruct AV 202 to transmit its stored AV data (e.g., AV 202 transmits its stored AV data to computer system 210). In some examples, AV 202 may transmit its stored AV data based on a set of priorities received from computer system 210. In some cases, AV 202 may transmit its stored AV data based on a neural network (e.g., neural network 600 as illustrated in FIG. 6) located on AV 202. For example, the neural network located on AV 202 may use machine learning algorithms to determine the set of priorities for transmitting the stored AV data. In some aspects, the set of priorities may instruct AV 202 on the order (e.g., sequence over time) of transmitting different portions of the stored AV data. For example, the AV data stored on AV 202 may include data from one or more example events or conditions associated with one or more data collection triggers, as discussed above in FIG. 1.

Figure 3:
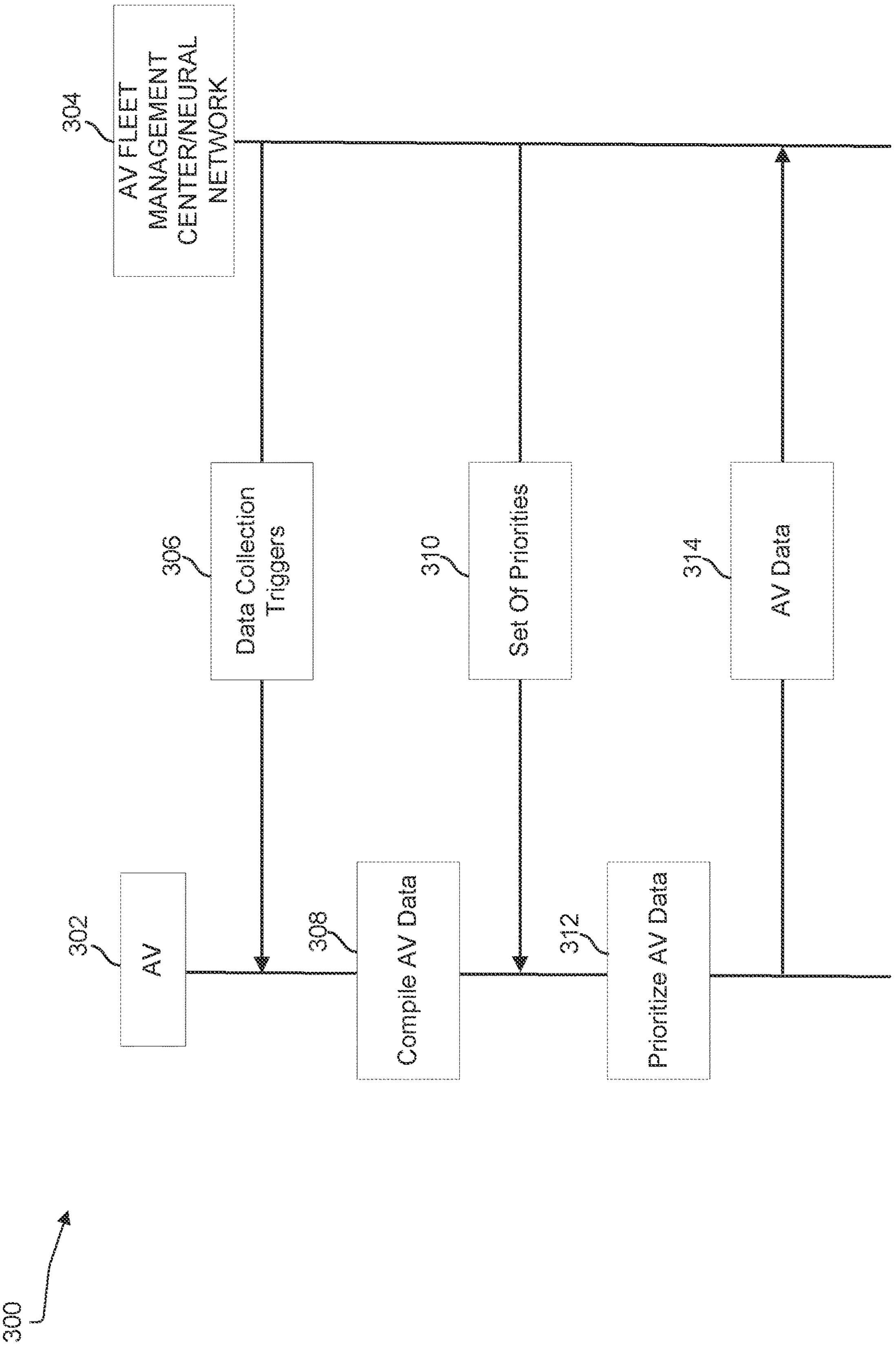
FIG. 3 illustrates an example of a process for implementing AV data collection and data offload, according to some examples of the present disclosure.

FIG. 3 illustrates an example of a process 300 for implementing AV data collection and data offloading, according to some examples of the present disclosure. In some aspects, process 300 may be performed by AV 302 (e.g., AV 102 as illustrated in FIG. 1) and AV fleet management center 304 (e.g., AV fleet management center 112 or A V fleet management center 216 as illustrated in FIG. 1 and FIG. 2, respectively). In some cases, AV 302 and/or AV fleet management center 304 may include one or more machine learning models (e.g., a neural network such as deep learning neural network 600).

At block 306, AV 302 may receive one or more data collection triggers from the AV fleet management center 304. In some aspects, the one or more data collection triggers may specify one or more conditions that cause AV 302 to compile AV data. In some aspects, the data collection triggers may be generated by an AV fleet management system (e.g., AV fleet management system 214) located at AV fleet management center 304. In some examples, the data collection triggers may be provided by an operator (e.g., technician 206) of AV fleet management center 304 (e.g., via a GUI and/or some other interface). In some instances, the data collection triggers may be generated using machine learning algorithms.

At block 308, AV 302 may compile AV data by collecting data from one or more sensor systems (e.g., sensor systems 504, 506, and 508 as illustrated in FIG. 5) from the environment (e.g., environment 114) where AV 302 is autonomously navigating. In some aspects, AV 302 may compile AV data from stored data (e.g., sensor data, machine learning model state, and/or other data on local computing device 510) that may be stored on the local computing device (e.g., local computing device 510) located on AV 302. In some instances, compiling AV data (e.g., for an event or condition identified by one or more data collection triggers from block 306) from stored AV data may result in a smaller file size (e.g., less bytes of data) compared to the stored AV data on AV 302. In some cases, the compiled AV data file size (e.g., a filtered set of data from the stored AV data) can enable AV 302 to transmit AV data to AV fleet management center 304 while autonomously navigating.

At block 310, the AV 302 may receive a set of priorities from the AV fleet management center 304. At block 312, the AV 302 may prioritize collection, assembly, or transmission of AV data associated with data collection triggers (e.g., from block 306) based on the received set of priorities from block 310. In some cases, the set of priorities from block 310 may instruct AV 302 on the prioritization of transmitting the AV data to AV fleet management center 304. For example, AV 302 may transmit a portion or a subset of AV data (e.g., compiled from data collection or data assembly) before another subset based on a transmission priority value. The AV 302, based on the set of priorities, may transmit (e.g., transmit via a cellular network) a subset of AV data while autonomously navigating and another subset of AV data at AV fleet management center 304 (e.g., transmit via Wi-Fi). In some instances, the set of priorities may instruct AV 302 on the prioritization of collecting or assembling AV data. For example, the set of priorities may instruct AV 302 to collect AV data for a collision event before assembling AV data for a specified time window (e.g., for a specified prior time range of stored sensor data on the local computing device of AV 302).

At block 314, AV 302 may transmit AV data to AV fleet management center 304. In some examples, AV 302 may transmit AV data to the AV fleet management system (e.g., located at AV fleet management center 304) while autonomously navigating. In some cases, AV 302 may transmit AV data to the AV fleet management system while AV 302 is located at AV fleet management center 304.

Figure 4:
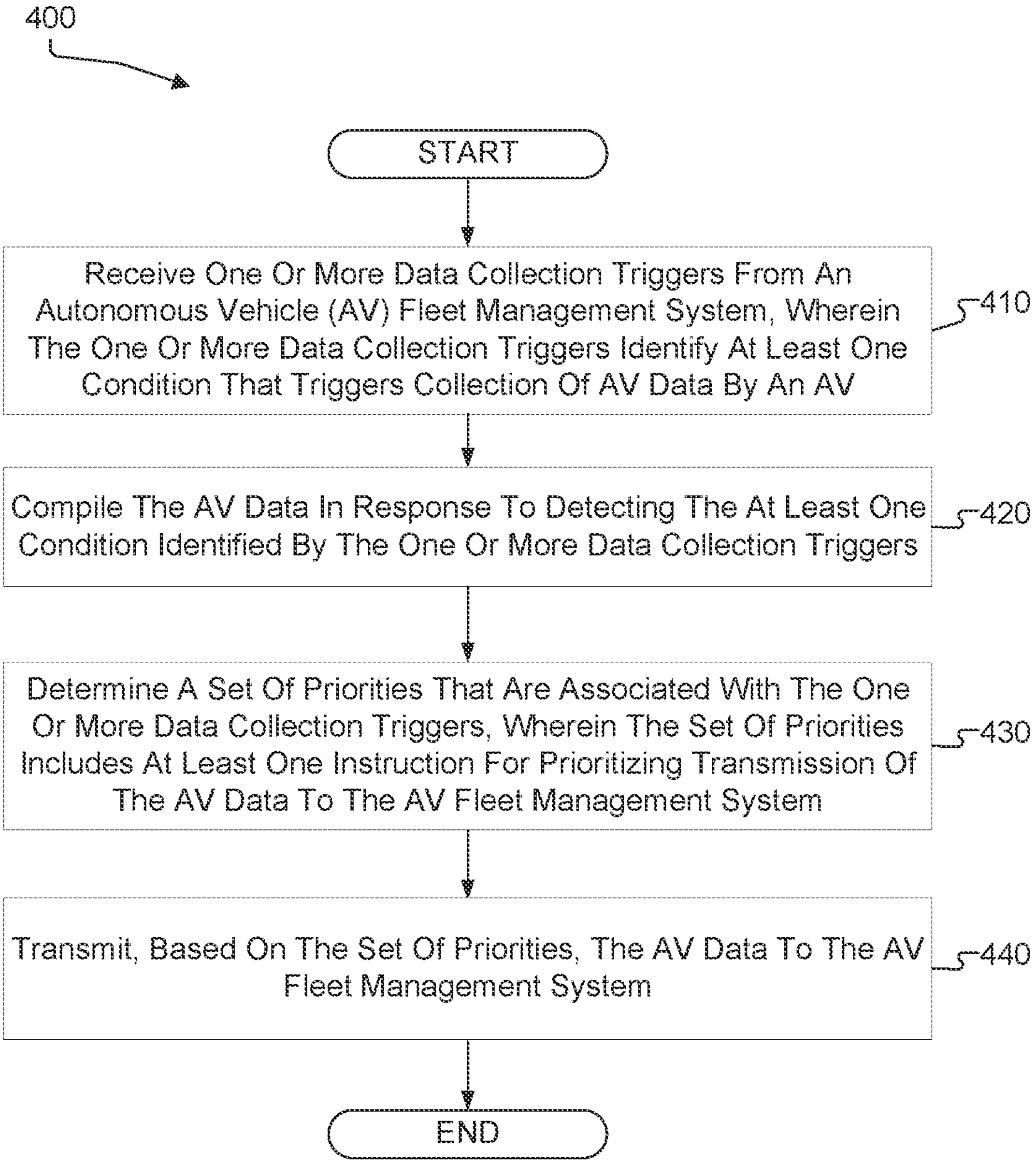
FIG. 4 illustrates another example of a process for implementing AV data collection and data offload, according to some examples of the present disclosure.

FIG. 4 illustrates another example of a process 400 for implementing AV data collection and offload, according to some examples of the present disclosure. At block 410, the process 400 includes receiving one or more data collection triggers from an autonomous vehicle (AV) fleet management system, wherein the one or more data collection triggers identify at least one condition that triggers collection of AV data by an AV. For example, AV 102 may receive one or more data collection triggers from AV fleet management center 112 (e.g., via AV fleet management system 214 located at AV fleet management center 112 or 216).

At block 420, the process 400 includes compiling the AV data in response to detecting the at least one condition identified by the one or more data collection triggers. For example, AV 102 may compile AV data in response to detecting collision event 106. In some examples, the at least one condition can include at least one of an event timeframe, a collision event, an intrusion event, a map change detection, a safety metric detection, and a traffic condition. For example, AV 102 may compile AV data in response to an event timeframe (e.g., between midnight and 6:00 AM on Monday); a collision event detection (e.g., cyclist bumps into AV 102); an intrusion event (e.g., person breaks window of AV 102); a map change detection event (e.g., additional lanes added to a street); a safety metric detection (e.g., AV 102 stopped within threshold distance of another vehicle); or a traffic condition (e.g., lane closure due to accident). In some aspects, the AV data can include sensor data (e.g., camera data, LiDAR data, etc.). In some cases, the AV data can include data associated with one or more machine learning models operating on the AV. For instance, the AV data can include one or more of the inputs, outputs, weights, state, etc. associated with perception stack 512, localization stack 514, prediction stack 516, planning stack 518, communications stack 520, control stack 522, and/or any other machine learning model associated with AV 502.

At block 430, the process 400 includes determining a set of priorities that are associated with the one or more data collection triggers, wherein the set of priorities includes at least one instruction for prioritizing transmission of the AV data to the AV fleet management system. For example, AV 102 may receive a set of priorities from AV fleet management center 112 that include at least one instruction for prioritizing transmission of AV data to AV fleet management center 112. In some cases, the at least one instruction for prioritizing transmission of the AV data includes at least one of a transmission network, a transmission timeframe, a transmission priority value, and a bandwidth metric. For instance, the at least one instruction can specify a cellular network or a Wi-Fi network, a window of time for transmitting the AV data, an acceptable time delay for transmitting the AV data, etc. In some cases, the transmission priority value can be used to prioritize transmission of different sets of AV data. For example, AV data having a transmission priority value of 1 may be transmitted over AV data having a transmission priority value of 2.

In some examples, the set of priorities can further include at least one instruction for prioritizing the collection of the AV data. In some cases, the at least one instruction for prioritizing collection of the AV data can include at least one of a processing time, a processing priority value, and a memory allocation metric. For instance, AV 102 may prioritize collection of AV data associated with a first event (e.g., collision event) having a higher processing priority value than a second event (e.g., intrusion event). In some cases, AV 102 may prioritize collection of AV data associated with events that require less processing time and/or less memory allocation. In some aspects, an event that is associated with a high processing priority value may supersede standard AV functions. For example, an AV may pull over to the side of the road (e.g., temporarily cease navigation) to process AV data associated with a high processing priority value that requires significant compute resources.

In some cases, the set of priorities can be received from the AV fleet management system. For example, AV fleet management system 214 can send the set of priorities to AV 102. In some examples, the set of priorities can be determined by a machine learning model associated with the AV. For example, AV 102 may include a machine learning model that determines the set of priorities based on processing time, memory allocation, event severity, etc.

In some instances, compiling the AV data in response to detecting the at least on condition includes collecting sensor data from an environment encountered by the AV using one or more AV sensors. For example, AV 102 can use one or more sensors (e.g., sensor systems 504-508) to collect AV data from environment 114.

At block 440, the process 400 includes transmitting, based on the set of priorities, the AV data to the AV fleet management system. For example, AV 102 may transmit the AV data to AV fleet management system 214 while autonomously navigating an environment 114 or while AV 102 is at AV fleet management center 112.

FIG. 5 is a diagram illustrating an example autonomous vehicle (AV) environment 500, according to some examples of the present disclosure. One of ordinary skill in the art will understand that, for the AV environment 500 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill the art will appreciate that such variations do not depart from the scope of the present disclosure.

In this example, the AV environment 500 includes an AV 502, a data center 550, and a client computing device 570. The AV 502, the data center 550, and the client computing device 570 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 502 can navigate roadways without a human driver based on sensor signals generated by multiple sensor systems 504, 506, and 508. The sensor systems 504-508 can include one or more types of sensors and can be arranged about the AV 502. For instance, the sensor systems 504-508 can include Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 504 can be a camera system, the sensor system 506 can be a LIDAR system, and the sensor system 508 can be a RADAR system. Other examples may include any other number and type of sensors.

The AV 502 can also include several mechanical systems that can be used to maneuver or operate the AV 502. For instance, the mechanical systems can include a vehicle propulsion system 530, a braking system 532, a steering system 534, a safety system 536, and a cabin system 538, among other systems. The vehicle propulsion system 530 can include an electric motor, an internal combustion engine, or both. The braking system 532 can include an engine brake, brake pads, actuators, and/or any other suitable componentry configured to assist in decelerating the AV 502. The steering system 534 can include suitable componentry configured to control the direction of movement of the AV 502 during navigation. The safety system 536 can include lights and signal indicators, a parking brake, airbags, and so forth. The cabin system 538 can include cabin temperature control systems, in-cabin entertainment systems, and so forth. In some examples, the AV 502 might not include human driver actuators (e.g., steering wheel, handbrake, foot brake pedal, foot accelerator pedal, turn signal lever, window wipers, etc.) for controlling the AV 502. Instead, the cabin system 538 can include one or more client interfaces (e.g., Graphical User Interfaces (GUIs), Voice User Interfaces (VUIs), etc.) for controlling certain aspects of the mechanical systems 530-538.

The AV 502 can include a local computing device 510 that is in communication with the sensor systems 504-508, the mechanical systems 530-538, the data center 550, and the client computing device 570, among other systems. The local computing device 510 can include one or more processors and memory, including instructions that can be executed by the one or more processors. The instructions can make up one or more software stacks or components responsible for controlling the AV 502; communicating with the data center 550, the client computing device 570, and other systems; receiving inputs from riders, passengers, and other entities within the AV's environment; logging metrics collected by the sensor systems 504-508; and so forth. In this example, the local computing device 510 includes a perception stack 512, a localization stack 514, a prediction stack 516, a planning stack 518, a communications stack 520, a control stack 522, an AV operational database 524, and an HD geospatial database 526, among other stacks and systems.

The perception stack 512 can enable the AV 502 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 504-508, the localization stack 514, the HD geospatial database 526, other components of the AV, and other data sources (e.g., the data center 550, the client computing device 570, third party data sources, etc.). The perception stack 512 can detect and classify objects and determine their current locations, speeds, directions, and the like. In addition, the perception stack 512 can determine the free space around the AV 502 (e.g., to maintain a safe distance from other objects, change lanes, park the AV, etc.). The perception stack 512 can identify environmental uncertainties, such as where to look for moving objects, flag areas that may be obscured or blocked from view, and so forth. In some examples, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The localization stack 514 can determine the AV's position and orientation (pose) using different methods from multiple systems (e.g., GPS, IMUs, cameras, LIDAR, RADAR, ultrasonic sensors, the HD geospatial database 526, etc.). For example, in some cases, the AV 502 can compare sensor data captured in real-time by the sensor systems 504-508 to data in the HD geospatial database 526 to determine its precise (e.g., accurate to the order of a few centimeters or less) position and orientation. The AV 502 can focus its search based on sensor data from one or more first sensor systems (e.g., GPS) by matching sensor data from one or more second sensor systems (e.g., LIDAR). If the mapping and localization information from one system is unavailable, the AV 502 can use mapping and localization information from a redundant system and/or from remote data sources.

The prediction stack 516 can receive information from the localization stack 514 and objects identified by the perception stack 512 and predict a future path for the objects. In some examples, the prediction stack 516 can output several likely paths that an object is predicted to take along with a probability associated with each path. For each predicted path, the prediction stack 516 can also output a range of points along the path corresponding to a predicted location of the object along the path at future time intervals along with an expected error value for each of the points that indicates a probabilistic deviation from that point.

The planning stack 518 can determine how to maneuver or operate the AV 502 safely and efficiently in its environment. For example, the planning stack 518 can receive the location, speed, and direction of the AV 502, geospatial data, data regarding objects sharing the road with the AV 502 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 502 from one point to another and outputs from the perception stack 512, localization stack 514, and prediction stack 516. The planning stack 518 can determine multiple sets of one or more mechanical operations that the AV 502 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 518 can select from multiple backup plans to carry out. For example, while preparing to change lanes to turn right at an intersection, another vehicle may aggressively cut into the destination lane, making the lane change unsafe. The planning stack 518 could have already determined an alternative plan for such an event. Upon its occurrence, it could help direct the AV 502 to go around the block instead of blocking a current lane while waiting for an opening to change lanes.

The control stack 522 can manage the operation of the vehicle propulsion system 530, the braking system 532, the steering system 534, the safety system 536, and the cabin system 538. The control stack 522 can receive sensor signals from the sensor systems 504-508 as well as communicate with other stacks or components of the local computing device 510 or a remote system (e.g., the data center 550) to effectuate operation of the AV 502. For example, the control stack 522 can implement the final path or actions from the multiple paths or actions provided by the planning stack 518. This can involve turning the routes and decisions from the planning stack 518 into commands for the actuators that control the AV's steering, throttle, brake, and drive unit.

The communications stack 520 can transmit and receive signals between the various stacks and other components of the AV 502 and between the AV 502, the data center 550, the client computing device 570, and other remote systems. The communications stack 520 can enable the local computing device 510 to exchange information remotely over a network, such as through an antenna array or interface that can provide a metropolitan Wi-Fi network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 520 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Low Power Wide Area Network (LPWAN), Bluetooth®, infrared, etc.).

The HD geospatial database 526 can store HD maps and related data of the streets upon which the AV 502 travels. In some examples, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 524 can store raw AV data generated by the sensor systems 504-508, stacks 512-522, and other components of the AV 502 and/or data received by the AV 502 from remote systems (e.g., the data center 550, the client computing device 570, etc.). In some examples, the raw AV data can include HD LIDAR point cloud data, image data, RADAR data, GPS data, and other sensor data that the data center 550 can use for creating or updating AV geospatial data or for creating simulations of situations encountered by AV 502 for future testing or training of various machine learning algorithms that are incorporated in the local computing device 510.

The data center 550 can include a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and/or any other network. The data center 550 can include one or more computing devices remote to the local computing device 510 for managing a fleet of AVs and AV-related services. For example, in addition to managing the AV 502, the data center 550 may also support a ridesharing service, a delivery service, a remote/roadside assistance service, street services (e.g., street mapping, street patrol, street cleaning, street metering, parking reservation, etc.), and the like.

The data center 550 can send and receive various signals to and from the AV 502 and the client computing device 570. These signals can include sensor data captured by the sensor systems 504-508, roadside assistance requests, software updates, ridesharing pick-up and drop-off instructions, and so forth. In this example, the data center 550 includes a data management platform 552, an Artificial Intelligence/Machine Learning (AI/ML) platform 554, a simulation platform 556, a remote assistance platform 558, and a ridesharing platform 560, and a map management platform 562, among other systems.

The data management platform 552 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), and/or data having other characteristics. The various platforms and systems of the data center 550 can access data stored by the data management platform 552 to provide their respective services.

The AI/ML platform 554 can provide the infrastructure for training and evaluating machine learning algorithms for operating the AV 502, the simulation platform 556, the remote assistance platform 558, the ridesharing platform 560, the map management platform 562, and other platforms and systems. Using the AI/ML platform 554, data scientists can prepare data sets from the data management platform 552; select, design, and train machine learning models; evaluate, refine, and deploy the models; maintain, monitor, and retrain the models; and so on.

The simulation platform 556 can enable testing and validation of the algorithms, machine learning models, neural networks, and other development efforts for the AV 502, the remote assistance platform 558, the ridesharing platform 560, the map management platform 562, and other platforms and systems. The simulation platform 556 can replicate a variety of driving environments and/or reproduce real-world scenarios from data captured by the AV 502, including rendering geospatial information and road infrastructure (e.g., streets, lanes, crosswalks, traffic lights, stop signs, etc.) obtained from a cartography platform (e.g., map management platform 562); modeling the behavior of other vehicles, bicycles, pedestrians, and other dynamic elements; simulating inclement weather conditions, different traffic scenarios; and so on.

The remote assistance platform 558 can generate and transmit instructions regarding the operation of the AV 502. For example, in response to an output of the AI/ML platform 554 or other system of the data center 550, the remote assistance platform 558 can prepare instructions for one or more stacks or other components of the AV 502.

The ridesharing platform 560 can interact with a customer of a ridesharing service via a ridesharing application 572 executing on the client computing device 570. The client computing device 570 can be any type of computing system such as, for example and without limitation, a server, desktop computer, laptop computer, tablet computer, smartphone, smart wearable device (e.g., smartwatch, smart eyeglasses or other Head-Mounted Display (HMD), smart ear pods, or other smart in-ear, on-ear, or over-ear device, etc.), gaming system, or any other computing device for accessing the ridesharing application 572. The client computing device 570 can be a customer's mobile computing device or a computing device integrated with the AV 502 (e.g., the local computing device 510). The ridesharing platform 5160 can receive requests to pick up or drop off from the ridesharing application 5172 and dispatch the AV 5102 for the trip.

Map management platform 562 can provide a set of tools for the manipulation and management of geographic and spatial (geospatial) and related attribute data. The data management platform 552 can receive LIDAR point cloud data, image data (e.g., still image, video, etc.), RADAR data, GPS data, and other sensor data (e.g., raw data) from one or more AVs 502, Unmanned Aerial Vehicles (UAVs), satellites, third-party mapping services, and other sources of geospatially referenced data. The raw data can be processed, and map management platform 562 can render base representations (e.g., tiles (2D), bounding volumes (3D), etc.) of the AV geospatial data to enable users to view, query, label, edit, and otherwise interact with the data. Map management platform 562 can manage workflows and tasks for operating on the AV geospatial data. Map management platform 562 can control access to the AV geospatial data, including granting or limiting access to the AV geospatial data based on user-based, role-based, group-based, task-based, and other attribute-based access control mechanisms. Map management platform 562 can provide version control for the AV geospatial data, such as to track specific changes that (human or machine) map editors have made to the data and to revert changes when necessary. Map management platform 562 can administer release management of the AV geospatial data, including distributing suitable iterations of the data to different users, computing devices, AVs, and other consumers of HD maps. Map management platform 562 can provide analytics regarding the AV geospatial data and related data, such as to generate insights relating to the throughput and quality of mapping tasks.

In some embodiments, the map viewing services of map management platform 562 can be modularized and deployed as part of one or more of the platforms and systems of the data center 550. For example, the AI/ML platform 554 may incorporate the map viewing services for visualizing the effectiveness of various object detection or object classification models, the simulation platform 556 may incorporate the map viewing services for recreating and visualizing certain driving scenarios, the remote assistance platform 558 may incorporate the map viewing services for replaying traffic incidents to facilitate and coordinate aid, the ridesharing platform 560 may incorporate the map viewing services into the client application 572 to enable passengers to view the AV 502 in transit en route to a pick-up or drop-off location, and so on.

While the autonomous vehicle 502, the local computing device 510, and the autonomous vehicle environment 500 are shown to include certain systems and components, one of ordinary skill will appreciate that the autonomous vehicle 502, the local computing device 510, and/or the autonomous vehicle environment 500 can include more or fewer systems and/or components than those shown in FIG. 5. For example, the autonomous vehicle 502 can include other services than those shown in FIG. 5 and the local computing device 510 can also include, in some instances, one or more memory devices (e.g., RAM, ROM, cache, and/or the like), one or more network interfaces (e.g., wired and/or wireless communications interfaces and the like), and/or other hardware or processing devices that are not shown in FIG. 5. An illustrative example of a computing device and hardware components that can be implemented with the local computing device 510 is described below with respect to FIG. 7.

In FIG. 6, the disclosure now turns to a further discussion of models that can be used through the environments and techniques described herein. FIG. 6 is an example of a deep learning neural network 600 that can be used to implement all or a portion of the systems and techniques described herein (e.g., neural network 600 can be used to implement a perception module (or perception system) as discussed above). In some aspects, neural network 600 may be trained to determine one or more data collection triggers that identify one or more events for an autonomous vehicle to collect AV data, assemble AV data, transmit AV data, or a combination thereof. In some examples, neural network 600 may be trained to determine a set of priorities for transmitting AV data to an AV fleet management center (e.g., AV fleet management center 112 and 216 as illustrated in FIG. 1 and FIG. 2).

In some examples, an input layer 620 can be configured to receive sensor data and/or data relating to an environment surrounding an AV. Neural network 600 includes multiple hidden layers 622*a*, 622*b*, through 622*n*. The hidden layers 622*a*, 622*b*, through 622*n* include "n" number of hidden layers, where "n" is an integer greater than or equal to one. The number of hidden layers can be made to include as many layers as needed for the given application. Neural network 600 further includes an output layer 621 that provides an output resulting from the processing performed by the hidden layers 622*a*, 622*b*, through 622*n*.

The neural network 600 is a multi-layer neural network of interconnected nodes. Each node can represent a piece of information. Information associated with the nodes is shared among the different layers and each layer retains information as information is processed. In some cases, the neural network 600 can include a feed-forward network, in which case there are no feedback connections where outputs of the network are fed back into itself. In some cases, the neural network 600 can include a recurrent neural network, which can have loops that allow information to be carried across nodes while reading in input.

Information can be exchanged between nodes through node-to-node interconnections between the various layers. Nodes of the input layer 620 can activate a set of nodes in the first hidden layer 622*a*. For example, as shown, each of the input nodes of the input layer 620 is connected to each of the nodes of the first hidden layer 622*a*. The nodes of the first hidden layer 622*a* can transform the information of each input node by applying activation functions to the input node information. The information derived from the transformation can then be passed to and can activate the nodes of the next hidden layer 622*b*, which can perform their own designated functions. Example functions include convolutional, up-sampling, data transformation, and/or any other suitable functions. The output of the hidden layer 622*b* can then activate nodes of the next hidden layer, and so on. The output of the last hidden layer 622*n* can activate one or more nodes of the output layer 621, at which an output is provided. In some cases, while nodes in the neural network 600 are shown as having multiple output lines, a node can have a single output and all lines shown as being output from a node represent the same output value.

In some cases, each node or interconnection between nodes can have a weight that is a set of parameters derived from the training of the neural network 600. Once the neural network 600 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 600 to be adaptive to inputs and able to learn as more and more data is processed.

The neural network 600 is pre-trained to process the features from the data in the input layer 620 using the different hidden layers 622*a*, 622*b*, through 622*n* in order to provide the output through the output layer 621.

In some cases, the neural network 600 can adjust the weights of the nodes using a training process called backpropagation. A backpropagation process can include a forward pass, a loss function, a backward pass, and a weight update. The forward pass, loss function, backward pass, and parameter/weight update is performed for one training iteration. The process can be repeated for a certain number of iterations for each set of training data until the neural network 600 is trained well enough so that the weights of the layers are accurately tuned.

To perform training, a loss function can be used to analyze error in the output. Any suitable loss function definition can be used, such as a Cross-Entropy loss. Another example of a loss function includes the mean squared error (MSE), defined as E_total=Σ(½ (target-output)^2). The loss can be set to be equal to the value of E_total.

The loss (or error) will be high for the initial training data since the actual values will be much different than the predicted output. The goal of training is to minimize the amount of loss so that the predicted output is the same as the training output. The neural network 600 can perform a backward pass by determining which inputs (weights) most contributed to the loss of the network, and can adjust the weights so that the loss decreases and is eventually minimized.

The neural network 600 can include any suitable deep network. One example includes a Convolutional Neural Network (CNN), which includes an input layer and an output layer, with multiple hidden layers between the input and out layers. The hidden layers of a CNN include a series of convolutional, nonlinear, pooling (for downsampling), and fully connected layers. The neural network 600 can include any other deep network other than a CNN, such as an autoencoder, Deep Belief Nets (DBNs), Recurrent Neural Networks (RNNs), among others.

As understood by those of skill in the art, machine-learning based classification techniques can vary depending on the desired implementation. For example, machine-learning classification schemes can utilize one or more of the following, alone or in combination: hidden Markov models; RNNs; CNNs; deep learning; Bayesian symbolic methods; Generative Adversarial Networks (GANs); support vector machines; image registration methods; and applicable rule-based systems. Where regression algorithms are used, they may include but are not limited to: a Stochastic Gradient Descent Regressor, a Passive Aggressive Regressor, etc.

Machine learning classification models can also be based on clustering algorithms (e.g., a Mini-batch K-means clustering algorithm), a recommendation algorithm (e.g., a Minwise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

Figure 7:
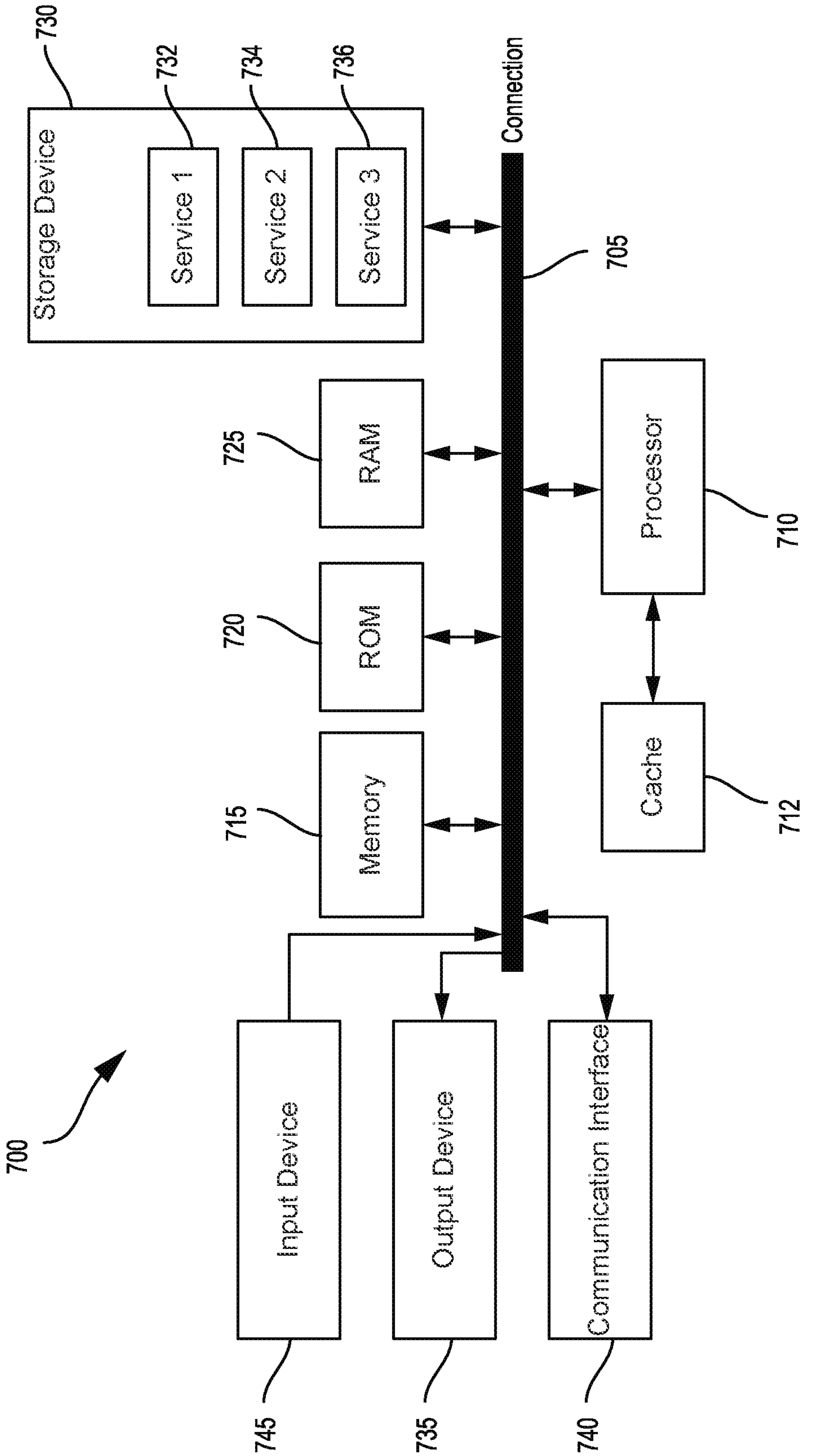
FIG. 7 illustrates an example processor-based system with which some aspects of the subject technology can be implemented.

FIG. 7 illustrates an example processor-based system with which some aspects of the subject technology can be implemented. For example, processor-based system 700 can be any computing device making up, or any component thereof in which the components of the system are in communication with each other using connection 705. Connection 705 can be a physical connection via a bus, or a direct connection into processor 710, such as in a chipset architecture. Connection 705 can also be a virtual connection, networked connection, or logical connection.

In some embodiments, computing system 700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 700 includes at least one processing unit (Central Processing Unit (CPU) or processor) 710 and connection 705 that couples various system components including system memory 715, such as Read-Only Memory (ROM) 720 and Random-Access Memory (RAM) 725 to processor 710. Computing system 700 can include a cache of high-speed memory 712 connected directly with, in close proximity to, or integrated as part of processor 710.

Processor 710 can include any general-purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 740 may also include one or more Global Navigation Satellite System (GNSS) receivers or transceivers that are used to determine a location of the computing system 700 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 730 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 730 can include software services, servers, services, etc., that when the code that defines such software is executed by the processor 710, it causes the system 700 to perform a function. In some embodiments, a hardware service that performs a particular function can include the software component stored in a computer-readable medium in connection with the necessary hardware components, such as processor 710, connection 705, output device 735, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A system comprising:

at least one memory; and at least one processor coupled to the at least one memory, the at least one processor configured to:

receive one or more data collection triggers from an autonomous vehicle (AV) fleet management system, wherein the one or more data collection triggers identify at least one condition that triggers collection of AV data by an AV;

compile the AV data based on detecting the at least one condition identified by the one or more data collection triggers;

determine a set of priorities that are associated with the one or more data collection triggers, wherein the set of priorities includes at least one instruction for prioritizing transmission of the AV data to the AV fleet management system;

determine that the set of priorities satisfies a priority threshold;

based on determining that the set of priorities satisfies the priority threshold, instruct the AV to cease navigation to process the AV data; and transmit, based on the set of priorities, the AV data to the AV fleet management system.

2. The system of claim 1, wherein the at least one condition includes at least one of an event timeframe, a collision event, an intrusion event, a map change detection, a safety metric detection, and a traffic condition.

3. The system of claim 1, wherein the at least one instruction for prioritizing transmission of the AV data includes at least one of a transmission network, a transmission timeframe, a transmission priority value, and a bandwidth metric.

4. The system of claim 1, wherein the set of priorities further includes at least one instruction for prioritizing collection of the AV data.

5. The system of claim 4, wherein the at least one instruction for prioritizing collection of the AV data includes at least one of a processing time, a processing priority value, and a memory allocation metric.

6. The system of claim 1, wherein the set of priorities are received from the AV fleet management system.

7. The system of claim 1, wherein the set of priorities are determined by a machine learning model associated with the AV.

8. The system of claim 1, wherein to compile the AV data in response to detecting the at least one condition the at least one processor is further configured to collect sensor data from an environment encountered by the AV using one or more AV sensors.

9. A method comprising:

receiving one or more data collection triggers from an autonomous vehicle (AV) fleet management system, wherein the one or more data collection triggers identify at least one condition that triggers collection of AV data by an AV;

compiling the AV data based on detecting the at least one condition identified by the one or more data collection triggers;

determining a set of priorities that are associated with the one or more data collection triggers, wherein the set of priorities includes at least one instruction for prioritizing transmission of the AV data to the AV fleet management system;

determining that the set of priorities satisfies a priority threshold;

based on determining that the set of priorities satisfies the priority threshold, instructing the AV to cease navigation to process the AV data; and transmitting, based on the set of priorities, the AV data to the AV fleet management system.

10. The method of claim 9, wherein the at least one condition includes at least one of an event timeframe, a collision event, an intrusion event, a map change detection, a safety metric detection, and a traffic condition.

11. The method of claim 9, wherein the at least one instruction for prioritizing transmission of the AV data includes at least one of a transmission network, a transmission timeframe, a transmission priority value, and a bandwidth metric.

12. The method of claim 9, wherein the set of priorities further includes at least one instruction for prioritizing collection of the AV data.

13. The method of claim 12, wherein the at least one instruction for prioritizing collection of the AV data includes at least one of a processing time, a processing priority value, and a memory allocation metric.

14. The method of claim 9, wherein the set of priorities are received from the AV fleet management system.

15. The method of claim 9, wherein the set of priorities are determined by a machine learning model associated with the AV.

16. The method of claim 9, wherein compiling the AV data in response to detecting the at least one condition further comprises collecting sensor data from an environment encountered by the AV using one or more AV sensors.

17. A non-transitory computer-readable storage medium comprising at least one instruction for causing a computer or a processor to:

receive one or more data collection triggers from an autonomous vehicle (AV) fleet management system, wherein the one or more data collection triggers identify at least one condition that triggers collection of AV data by an AV;

compile the AV data based on detecting the at least one condition identified by the one or more data collection triggers;

determine a set of priorities that are associated with the one or more data collection triggers, wherein the set of priorities includes at least one instruction for prioritizing transmission of the AV data to the AV fleet management system;

determine that the set of priorities satisfies a priority threshold;

based on determining that the set of priorities satisfies the priority threshold, instruct the AV to cease navigation to process the AV data; and transmit, based on the set of priorities, the AV data to the AV fleet management system.

18. The non-transitory computer-readable storage medium of claim 17, wherein the at least one condition includes at least one of an event timeframe, a collision event, an intrusion event, a map change detection, a safety metric detection, and a traffic condition.

19. The non-transitory computer-readable storage medium of claim 17, wherein the at least one instruction for prioritizing transmission of the AV data includes at least one of a transmission network, a transmission timeframe, a transmission priority value, and a bandwidth metric.

20. The non-transitory computer-readable storage medium of claim 17, comprising further instructions for causing the processor or the computer to collect sensor data from an environment encountered by the AV using one or more AV sensors.

* * * * *